United States Patent [19]

Suzuki et al.

[11] Patent Number: 4,492,452
[45] Date of Patent: Jan. 8, 1985

[54] PICTURE BLUR-ALARM DEVICE FOR A CAMERA

[75] Inventors: Shinichi Suzuki, Yokohama; Masayuki Sasaki, Sagamihara; Toshinori Moriyasu, Chigasaki; Takao Arakawa, Takamatsu, all of Japan

[73] Assignee: Tokyo Shibaura Denki Kabushiki Kaisha, Japan

[21] Appl. No.: 482,562

[22] Filed: Apr. 6, 1983

[30] Foreign Application Priority Data

Apr. 7, 1982 [JP] Japan .................................. 57-57919
Apr. 7, 1982 [JP] Japan .................................. 57-57925

[51] Int. Cl.³ .............................................. G03B 7/08
[52] U.S. Cl. .................................................. 354/430
[58] Field of Search ......................................... 354/430

[56] References Cited

U.S. PATENT DOCUMENTS 4,218,119 8/1980 Schickedanz ...................... 354/430

FOREIGN PATENT DOCUMENTS 40423 3/1980 Japan .

OTHER PUBLICATIONS

Japanese Patent Disclosure (KOKAI) No. 55-40423; S. Hagioda et al., Mar. 21, 1980.

Primary Examiner—Russell E. Adams
Attorney, Agent, or Firm—Finnegan, Henderson, Farabow, Garrett & Dunner

[57] ABSTRACT

A picture blur-alarm device for a camera includes a photo-electric converter for time-sequentially sending brightness data including analog signal components which correspond to the brightness of the plurality of regions of an optical image of a foreground object, a comparator for comparing two successive brightness data time-sequentially issued from the photo-electric converter, and producing an output signal corresponding to the number of those of the analog signal components of a preceding brightness data which have different levels from corresponding analog signal components of a succeeding brightness data; and an alarm circuit which issues an alarm signal when an output signal from the comparator has a higher level than prescribed.

16 Claims, 22 Drawing Figures

PICTURE BLUR-ALARM DEVICE FOR A CAMERA

BACKGROUND OF THE INVENTION

This invention relates to a picture blur-alarm device for a camera. When a foreground object or camera body is shifted during the shutter operation, intolerable blur will appear in a picture. The blur denotes an indistinct portion of a picture which results from the relative movement between a film and an image of an object formed on the film through a lens system. With a conventional camera of aperture priority type, for example, when it is detected that an insufficient amount of light comes from a foreground object, the shutter speed is set slow, and then the high probability of blurring taking place is indicated. However, this type of camera cannot clearly determine in advance whether blurring appearing in a picture falls within an allowable limit. Therefore, it is only after the development of an exposed film that judgment can be made as to whether blurring has occurred to an extent falling within an allowable range. Accordingly, the possibility is great that an important picture will be lost.

SUMMARY OF THE INVENTION

It is accordingly an object of this invention to provide a picture blur-alarm device for warning of the possibility of a blur occurring in a picture.

To attain the above-mentioned object, this invention provides a picture blur-alarm device for a camera which comprises means which, during the shutter operation, time-sequentially generates output signals corresponding to the brightness of at least part of an optical image of a foreground object; means for comparing every two output signals generated at different timings from the signal-generating means; and means for producing a picture blur-alarm signal depending on the result of the comparison.

DETAILED DESCRIPTION OF THE PREFERRED EMBODIMENTS

Figure 1:
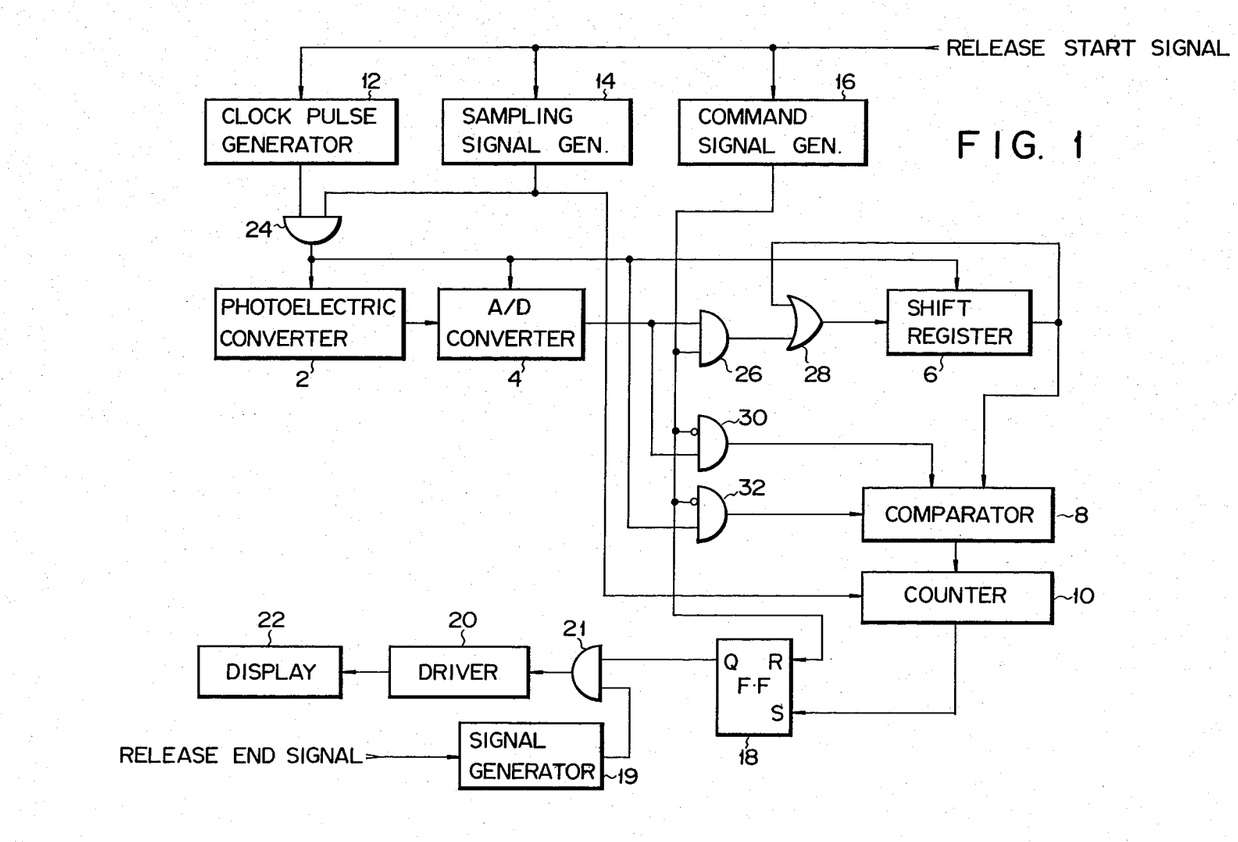
FIG. 1 is a circuit diagram of a picture blur-alarm device according to one embodiment of this invention.

Description will now be given with reference to FIG. 1 of a picture blur-alarm device according to one embodiment of this invention. This alarm device includes a photo-electric converter 2 which generates an electric signal corresponding to an optical image of a foreground object, an analog-digital (A/D) converter 4 which converts an output signal from the photo-electric converter into a digital signal, an n-stage shift register 6 which stores an optical image delivered from the A/D converter 4 immediately after the start of the shutter operation, a comparator 8 which compares optical image data generated from the A/D converter 4 with optical image data stored in the shift register 6 for each bit, and, when compared bits have different logic levels, produces an output pulse, and a counter 10 which counts output pulses from the comparator 8 and, when the contents reach a prescribed count, produces an output signal.

The prescribed count is defined in accordance with, for example, a shutter speed, the number of photodiodes involved in the photo-electric converter 2 and the extent to which the occurrence of a picture blur is tolerable.

The alarm device further includes a clock pulse generating circuit 12 which generates a clock pulse signal upon receipt of a release-starting signal issued at the shutter operation, a sampling signal generating circuit 14, a command signal generating circuit 16, a flip-flop circuit 18 whose set and reset terminals are respectively connected to the output terminals of the counter 10 and command signal generating circuit 16, a high level signal generator 19 which continues to produce a high level signal for a prescribed length of time after the termination of the shutter operation, and a display driver 20 for driving a display unit 22 which is actuated upon receipt of output signals from the flip-flop circuit 18 and high level signal generator 19 through an AND gate 21 to warn of the appearance of the condition in which a blur occurs.

When an output sampling signal from the sampling signal generating circuit 14 has a high level, an output clock pulse signal from the clock pulse generating circuit 12 is supplied through an AND gate 24 to the photo-electric converter 2, A/D converter 4 and shift register 6. The photo-electric converter 2 is set in place such that its center is aligned with the optical axis of, for example, a camera lens system. This photo-electric converter 2 is formed of n number of photodiodes. Upon receipt of n number of clock pulses from the clock pulse generating circuit 12 through the AND gate 24, output electrical signals from the respective photodiodes are time-sequentially supplied to the A/D converter 4. This A/D converter 4 successively produces bits having a logic level "1" or "0" optionally determined according to whether the respective output signals from the n number of photodiodes have a higher or lower voltage level than the reference voltage. As a result, a serial data of n bits or brightness data is produced. This reference voltage may be specified in advance. It is also possible to determine the reference voltage from at least one of n number of output signals which are generated from the photo-electric converter 2 each time a sampling signal is set at a high level.

Digital data from the A/D converter 4 is supplied to the shift register 6 through an AND gate 26 and OR gate 28, and also to a first input terminal of the comparator 8 through an AND gate 30. An output bit from the shift register 6 is fed back to the input terminal of the shift register 6 through the OR gate 28, and also to a second input terminal of the comparator 8. Upon receipt of clock pulses from the clock pulse generating circuit 12 through the AND gate 24 and another AND gate 32, the comparator 8 compares output bits from the A/D converter 4 with the respective output bits from the shift register 6. An output signal from the command signal generating circuit 16 is supplied to the AND gate 26, and an inverted signal thereof is delivered to the AND gate 30 and 32.

Figure 2A:
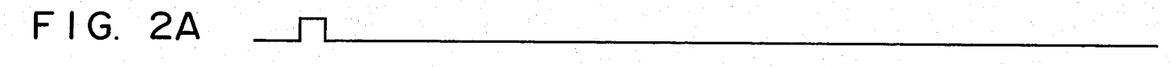
FIGS. 2A to 2I show signal waveforms to illustrate the operating of the alarm device of FIG. 1.
Figure 2B:
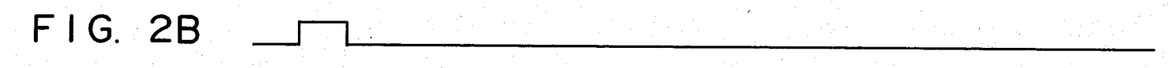
Figure 2C:
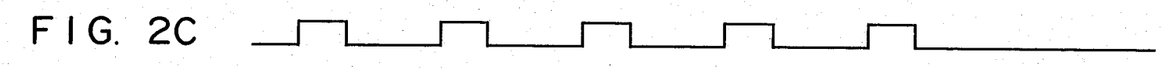
Figure 2D:
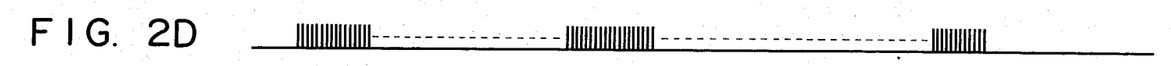

Description will now be given with reference to FIGS. 2A to 2I of the picture blur-alarm device of FIG. 1. First, when a release start signal is generated as shown in FIG. 2A by the shutter operation to commence photographing, output signals shown in FIGS. 2B, 2C and 2D are respectively produced from the command signal generating circuit 16, sampling signal generating circuit 14 and clock pulse generating circuit 12. When an output signal from the sampling signal generating circuit 14 is at a high level, then the A/D converter 4 produces serial data of n bits. Right after the generation of a release start signal, the command signal generating circuit 16 produces a write command signal having a high level. Consequently, output serial data of n bits from the A/D converter 4 is supplied to the shift register 6 through the AND gate 26 and OR gate 28. When the write command signal is set at a low level and then the sampling signal is set at a high level, n number of clock pulses are supplied to the photo-electric converter 2, A/D converter 4, shift register 6 and comparator 8 during the period in which the sampling signal is kept at a high level. As a result, n number of bit data stored in the shift register 6 are compared, while cyclically shifted, with n number of bit data successively issued from the A/D converter 4. In other words, two bit data issued at different timings from each photodiode are compared by the comparator 8. Assume now that an optical image of a foreground object is displaced with respect to a film. Then, the A/D converter 4 issues serial data of n bits having a different arrangement from that of serial data of n bits stored in the shift register 6.

Figure 2E:
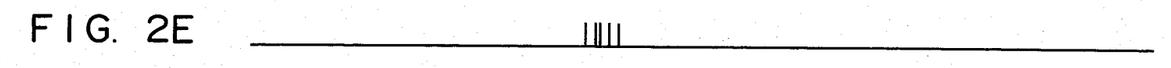
Figure 2F:
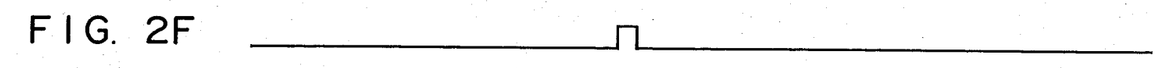
Figure 2G:
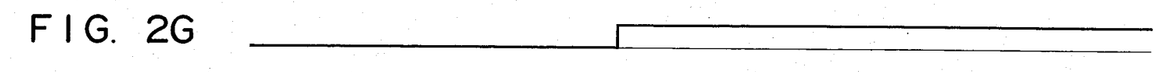

The comparator 8 generates pulses as shown in FIG. 2E each time it is detected that two input bit data have different logic levels. The counter 10 counts output pulses from the comparator 8. When it is detected that a larger number of pulses than a prescribed value have been generated from the comparator 8, namely, an intolerable blur is likely to appear in a picture, then a set signal is produced as shown in FIG. 2F to set the flip-flop circuit 18. As a result, the flip-flop circuit 18 supplies a Q output signal having a high level shown in FIG. 2G to the AND gate 21 to enable the same. Later when a release end signal shown in FIG. 2H indicating the termination of the shutter operation is issued, the signal generator 19 supplies an output signal of high level as shown in FIG. 2I to the display driver 20 through the AND gate 21 for a prescribed length of time. Accordingly, the display unit 22 is energized to visually inform the photographer of the possibility of an intolerable blur appearing in a picture.

Figure 2H:
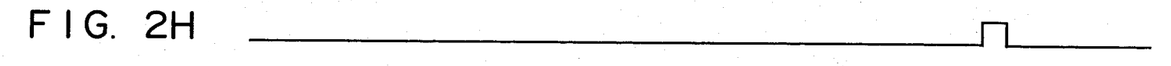
Figure 2I:
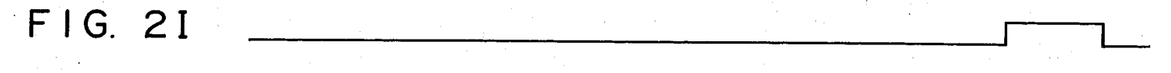

A release end signal shown in FIG. 2H is also supplied to the clock pulse generating circuit 12 and sampling signal generating circuit 14 to stop their operation. Each time an output sampling signal from the sampling signal generating circuit 14 is changed from a high to a low level, the counter 10 is reset. The flip-flop circuit 18 is reset when the succeeding write command signal is generated.

Description will now be given with reference to FIG. 3 of a picture blur-alarm device according to a second embodiment of this invention. This alarm device includes a photo-electric converter 102 which is formed of n number of linearly arranged photodiodes, and which is actuated in response to a sampling signal from a sampling signal generating circuit 114 and produces in parallel n number of output signals indicating the brightness pattern of a received optical image, and n number of analog memories 104-1 to 104-n which respectively receive n number of output signals from the photo-electric converter 102 through switches 106-1 to 106-n formed of, for example, MOS transistors.

Analog data stored in the analog memories 104-1 to 104-n are compared with n number of analog data generated from the photo-electric converter 102 in the corresponding comparators 108-1 to 108-n. Each of the comparators 108-1 to 108-n produces a bit signal having a logic level "1" when both input analog data supplied to the comparator have different voltage levels. Output signals from the comparators 108-1 to 108-n are summed in an adder 110. This adder 110 produces an output signal having a voltage level corresponding to the number of bit signals having a logic level "1" which are included in the output signals from the comparators 108-1 to 108-n. An output signal from the adder 110 is compared with an output reference voltage from a reference voltage generator 112 by a comparator 113. When an output signal from the adder 110 has a higher voltage level than the reference voltage, the comparator 113 produces an output signal, thereby setting the flip-flop circuit 18. A Q output signal from the flip-flop circuit 18 is supplied to the AND gate 21, together with an output signal from the signal generator 19. An output signal from the AND gate 21 is supplied to the display driver 20 for actuating the display unit 22. Upon receipt of an output signal from a command signal generating circuit 116, the flip-flop circuit 18 is reset.

Description will now be given with reference to FIG. 4A to FIG. 4H of the operation of a picture blur-alarm device of FIG. 3.

Figures 4A, 4B, 4C, 4D:
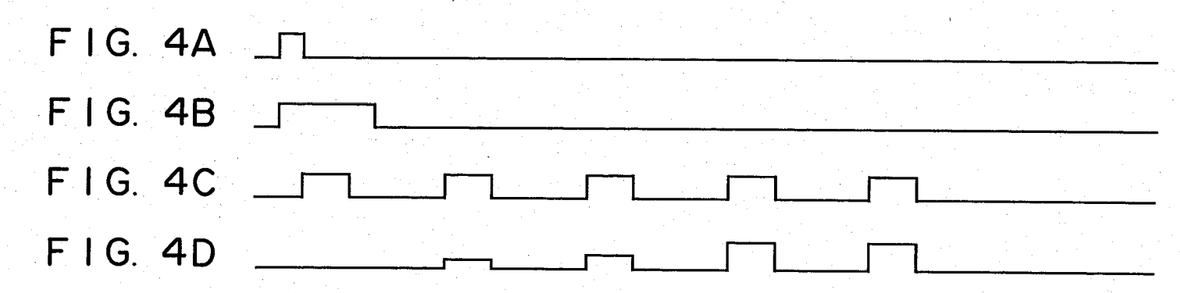
FIGS. 4A to 4H indicate signal waveforms to illustrate the operation of the alarm device of FIG. 3.
Figures 4E, 4F, 4G, 4H:
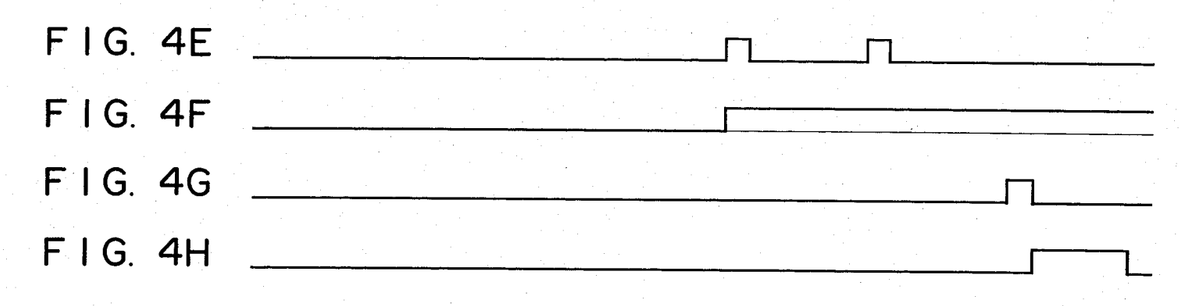

Initially when a release starting signal shown in FIG. 4A is given by the shutter operation to commence photographing, the command signal generating circuit 116 and sampling signal generating circuit 114 respectively produce signals as shown in FIGS. 4B and 4C. In case a command signal having a high voltage level is produced from the command signal generating circuit 116, the analog memories 104-1 to 104-n are supplied with an n number of analog data from the photo-electric converter 102 in response to a sampling signal received through the AND gate 118. When a command signal is set at a low level, the comparators 108-1 to 108-n compare output signals from the analog memories 104-1 to 104-n with n number of output signals from the photo-electric converter 102 in response to a sampling signal received through an AND gate 120. When both input analog signals have a larger voltage difference than a prescribed value, the comparators 108-1 to 108-n respectively generate a bit signal having a logic level "1" to the adder 110. This adder 110 produces a signal, as shown in FIG. 4D, having a voltage level corresponding to the number of bit signals having a logic level "1" which are included in the output signals from the comparators 108-1 to 108-n, When the adder 110 produces an output signal having a higher voltage level than prescribed, the comparator 113 generates an output signal as shown in FIG. 4E. Upon receipt of an output signal from the comparator 113, the flip-flop circuit 18 is set to produce a Q output signal as shown in FIG. 4F having a high level. Later, upon receipt of a release end signal shown in FIG. 4G denoting the termination of the shutter operation, the signal generator 19 supplies an output signal shown in FIG. 4H having a high level to the display driver 20 through the AND gate 21 for a prescribed length of time. As a result, the display unit 22 is actuated to inform the photographer that an intolerable blur is likely to occur in the picture. Though not shown, the release end signal of FIG. 4G is also supplied to the sampling signal generating circuit 114 to stop its operation.

Figure 3:
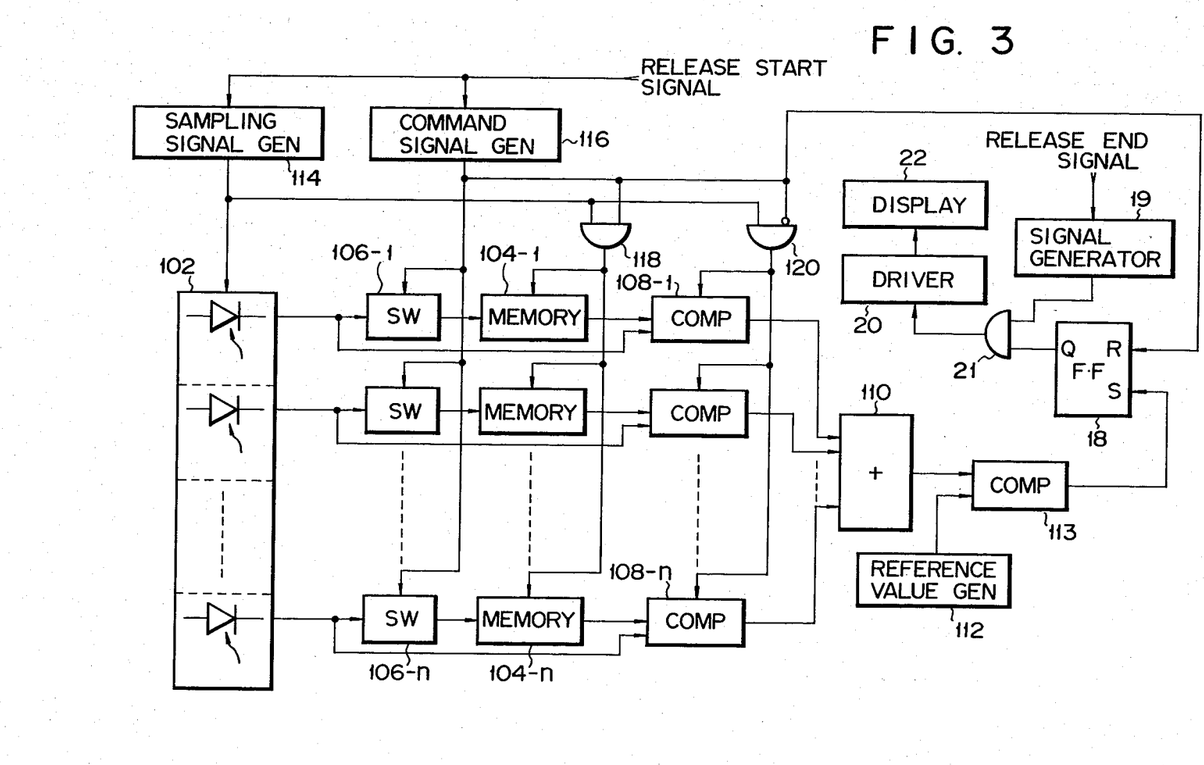
FIG. 3 is a circuit diagram of a picture blur-alarm device according to another embodiment of the invention.
Figures 5, 6:
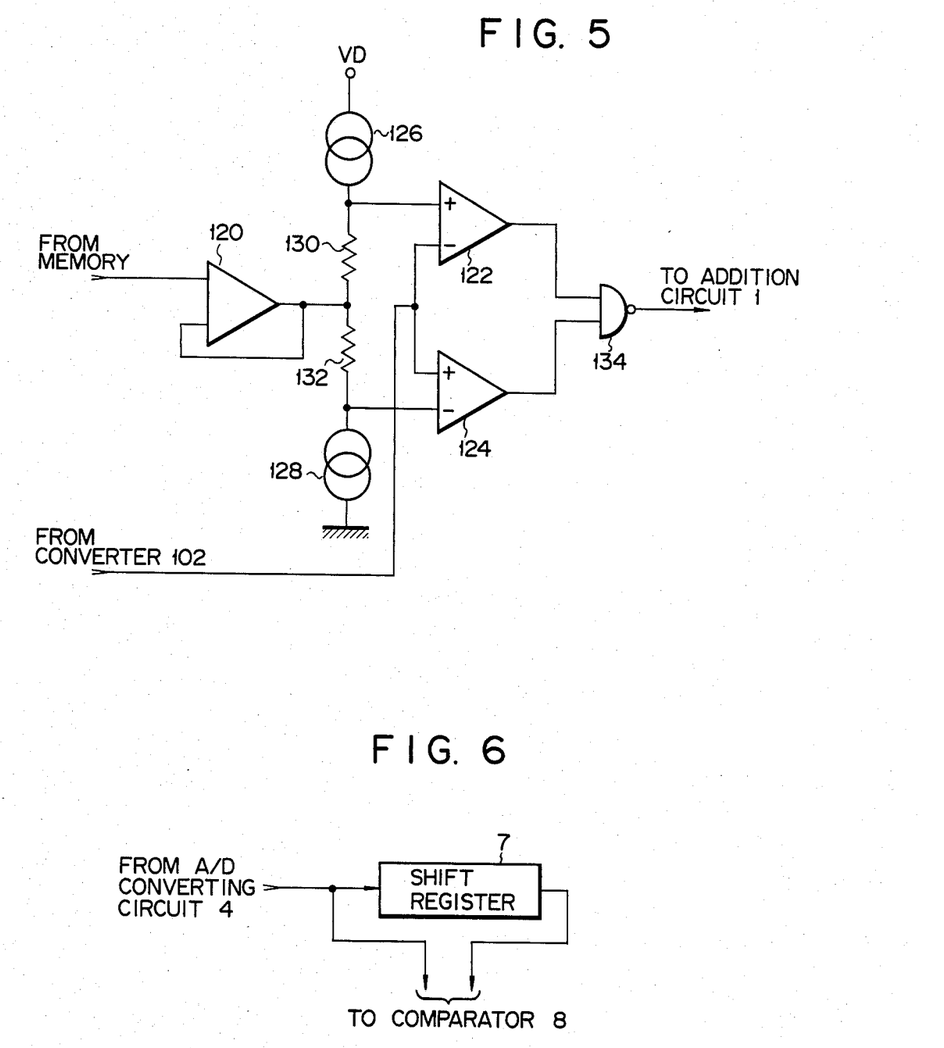
FIG. 5 is a modification of one of the comparators used in FIG. 3.
FIG. 6 is a modification of a shift register section used in FIG. 1.

FIG. 5 shows the circuit arrangement of a window comparator usable as one of the comparators 110-1 to 110-n (FIG. 3). This window comparator includes a voltage follower circuit 120 for receiving an output signal from one of the analog memories 104-1 to 104-n, a differential amplifier 122 whose inverted input terminal is supplied with a corresponding one of n output signals from the photo-electric converter 102, and a differential amplifier 124 whose noninverted input terminal is supplied with the corresponding output signal from the photo-electric converter 102.

The window comparator further includes a constant current source 126 connected at one end to the power supply terminal VD, a constant current source 128 grounded at one end, resisters 130 and 132 connected in series between the constant current sources 126 and 128, and a NAND gate 134 whose two input terminals are respectively connected to the output terminals of differential amplifiers 122 and 124 and whose output terminal is connected to the adder 110. The output terminal of the voltage follower circuit 120 is connected to the node between the resistors 130 and 132. The node between the constant current source 126 and resistor 130 is connected to the noninverted input terminal of the differential amplifier 122. The node between the resistor 132 and constant current source 128 is connected to the inverted input terminal of the differential amplifier 124.

Assume now that the voltage follower circuit 120 is supplied with an input voltage V1, and a current I flows through the resistors 130 and 132. In this case, the noninverted input terminal of the differential amplifier 122 is impressed with a voltage (V1+IR) where R denotes the resistance of each of the resistors 130 and 132. The inverted input terminal of the differential amplifier 124 is impressed with a voltage (V1−IR). Therefore as long as the corresponding one of n output signals from the photo-electric converter 102 has a voltage between the voltages (V1−IR) and (V1+IR), a signal having a logic level "1" continues to be issued from the differential amplifiers 122 and 124. Consequently, a signal having a logic level "0" is sent through the NAND gate 134. When the voltage of the aforesaid corresponding one of n output terminals becomes lower than the voltage (V1—IR) or rises above the voltage (V1+IR), then a signal having a logic level "1" is issued from the NAND gate 134.

Even when the voltage level of an output signal from, for example, the photo-electric converter 102 varies with the degree of brightness of a light surrounding a camera, the circuit arrangement of the comparator (FIG. 5) enables judgment of the possibility of the occurrence of a picture blur to be least affected. In other words, when the voltage level of an output signal from the photo-electric converter 102 varies with the degree of brightness of an optical image, the voltage level variation can be overlooked, if the extent of the variation falls within the range of ±IR. Namely, the possibility of a blur occurring in a picture can be judged appreciably correctly by reducing IR in the case of a high shutter speed and enlarging IR in the case of a slow shutter speed. Current I can be varied with, for example, the shutter speed. Voltage IR can be controlled in conformity with the shutter speed.

Description has been given of the picture blur-alarm device of this invention with reference to the foregoing embodiments. It will be noted, however, that the invention is not limited to these embodiments. With the first embodiment of FIG. 1, n number of bit data stored in the circulating shift register 6 were compared, while being cyclically shifted, with output bit data from the A/D converter 4. However, the contents of the shift register 6 can be compared, while being successively shifted, with the output bit data from the A/D converter 4. To this end, it is advised, as shown in FIG. 6, to omit the AND gates 26, 30 and OR gate 28, connect the output terminal of the A/D converter 4 to n bit shift register 7, and connect the output terminals of the A/D converter 4 and shift register 7 to the comparator 8. In this case, the shift register 7 acts as delay means.

Figure 7:
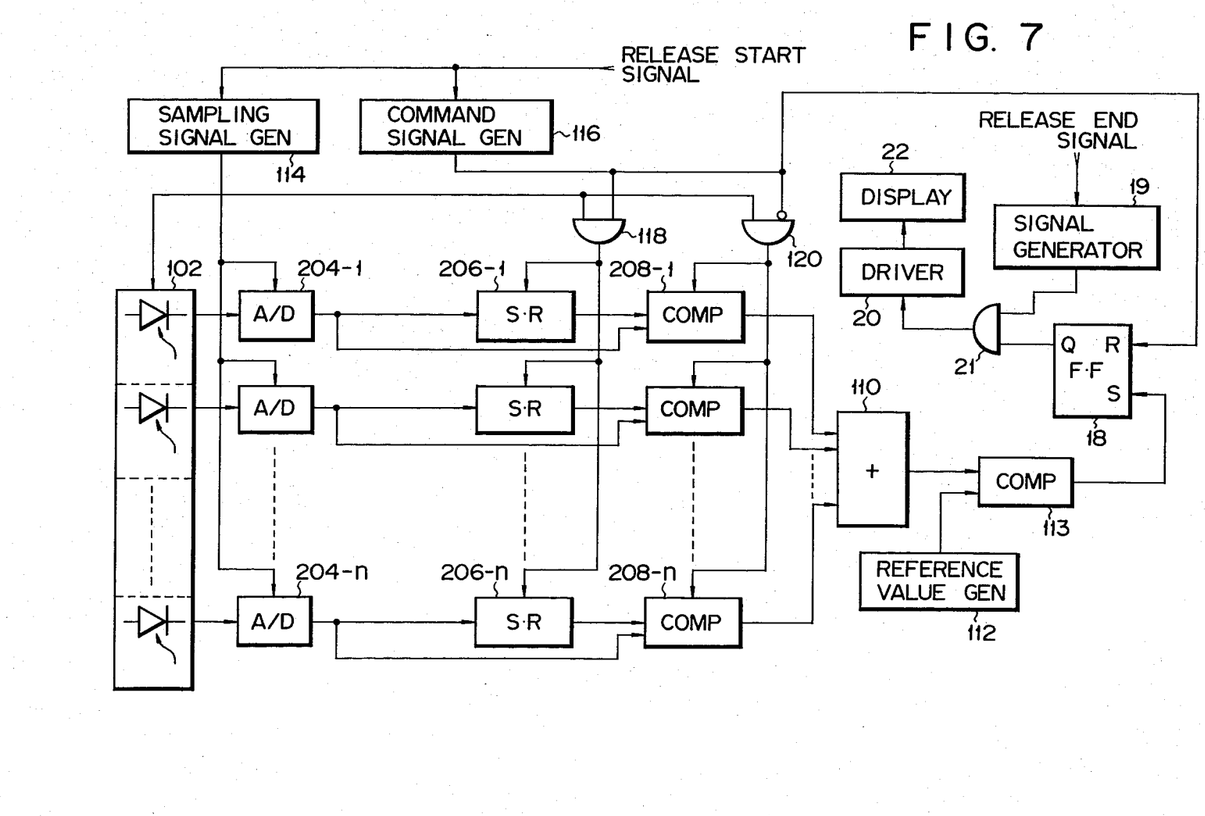
FIG. 7 is a circuit diagram of a picture blur-alarm device according to a further embodiment of the invention.

With the second embodiment of FIG. 3, an output signal from the photo-electric converter 102 was processed in an analog form. As shown in FIG. 7, the output signal can be processed in a digital form. With the circuit of FIG. 7, n number of output signals from a photo-electric converter 102 are converted into bit signals having a logic level "0" or "1" in the corresponding A/D converters 204-1 to 204-n in accordance with the voltage level. Output bit signals from the A/D converters 204-1 to 204-n are supplied to the corresponding one-bit shift registers 206-1 to 206-n and also to the input terminals of the corresponding comparators 208-1 to 208-n. When a release start signal is issued, the shift registers 206-1 to 206-n are actuated in response to a command signal from the command signal generating circuit 116, and respectively store bit signals from the corresponding A/D converters 204-1 to 204-n.

Later, each time the sampling signal generating circuit 114 produces a sampling signal having a high voltage level, the contents of the shift registers 206-1 to 206-n are compared with output bit signals from the A/D converters 204-1 to 204-n in the comparators 208-1 to 208-n. When each of the comparators 208-1 to 208-n is supplied with two input bit signals having different levels which are to be compared, the comparator supplies a bit signal having a logic level "1" to the adder 110. Output signals from the comparators 208-1 to 208-n are processed in the same manner as output signals from the comparators 108-1 to 108-n of FIG. 3.

This invention is applicable not only to the ordinary film type camera, but also an electronic still camera involving a magnetic disc as the recording medium.

Further, when stars in the night sky are to be photographed, namely when the shutter is operated at a very slow speed, it is possible to actuate the sampling signal generating circuit 14 or 114 interlockingly with the shutter mechanism so as to reduce the number of comparison operations per unit time by extending the period of a sampling signal.

What we claim is:

1. A picture-blur alarm device for a camera which device comprises:
   signal generating means which is actuated in response to the shutter operation to time-sequentially generate brightness data corresponding to the brightness of at least one part of an optical image of a foreground object;
   comparing means for successively comparing two brightness data which are issued at different timings from said signal generating means; and alarm means for producing an alarm signal in accordance with the result of a comparison conducted in said comparing means,
wherein said signal-generating means comprises:
photoelectric conversion means which is provided with a plurality of photoelectric conversion elements to successively generate groups of output analog signals from said plurality of photoelectric conversion elements; and
analog-digital conversion means which converts output analog signals from said photoelectric conversion means into bit data and time-sequentially supplies said comparing means with groups of bit data corresponding to groups of analog signals as brightness data, said photoelectric conversion means issuing in series output analog signals from said plurality of photoelectric conversion elements, and the analog-digital conversion means time-sequentially producing groups of serial bit data; and
said comparing means comprises bit data-storing means formed of a circulating type shift register for storing output serial brightness bit data from said analog-digital conversion means and cyclically supplying said serial brightness bit data; and
a comparing circuit for successively comparing serial bit data constituting output brightness data from the analog-digital conversion means with respective output serial bit data from said bit data-storing means, and producing an output signal when it is detected that both input bit data have different logic levels.

2. A picture blur-alarm device according to claim 1, wherein said alarm means comprises:
a drive circuit which is actuated in response to an output signal from said comparison circuit, and produces a drive signal when it is detected that said comparison circuit has generated a larger number of output signals than prescribed in a given comparing cycle; and
a display circuit which is operated in response to an output signal from said drive circuit.

3. A picture blur-alarm device according to claim 2, wherein said drive circuit comprises:
a counter for counting output signals from the comparator, and producing an output signal when a prescribed number of signals have been counted;
a signal generator generating a signal denoting the termination of the photographing operation; and
a driver for sending forth a drive signal in response to output signals from said counter and signal generator.

4. A picture blur-alarm device according to claim 1, wherein said photo-electric conversion means sends forth in parallel output analog signals from said plural photo-electric conversion elements; and said analog-digital conversion means is provided with a plurality of analog-digital conversion elements which respectively convert said analog signals into bit data.

5. A picture blur-alarm device according to claim 4, wherein said comparing means comprises:
a plurality of delay circuits for delaying output parallel brightness bit data from said analog-digital converter; and
a plurality of comparators for comparing output bit data from the plural analog-digital conversion elements with output bit data from the plural delay circuits, and producing an output signal when it is detected that both the input bit data have different logic levels.

6. A picture blur-alarm device according to claim 5, wherein said plurality of delay circuits are each formed of a one-bit shift register.

7. A picture blur-alarm device according to claim 6, wherein said alarm means comprises:
a drive circuit which issues a drive signal when it is detected that a larger number of the plurality of comparators than prescribed have sent forth an output signal; and
a display circuit which is actuated in response to an output drive signal from said drive circuit.

8. A picture blur-alarm device according to claim 7, wherein said drive circuit comprises:
an adder which adds together output signals from the plural comparators, and issues an output signal when the result of said addition indicates a larger value than prescribed;
a signal generator which generates an output signal when the photographing operation is brought to an end; and
a driver for generating a drive signal in response to output signals from said adder and signal generator.

9. A picture blur-alarm device according to claim 1, wherein said photo-electric conversion means comprises a plurality of photo-electric conversion elements, and successively produces groups of analog signals from said plurality of photo-electric conversion elements as brightness data.

10. A picture blur-alarm device according to claim 9, wherein the comparator comprises:
memory means for storing output parallel analog signals from the photo-electric conversion means which jointly constitute one brightness data; and
a plurality of comparators for comparing output parallel analog signals from said photo-electric conversion means which jointly constitute one brightness data with output parallel analog signals from said memory means, and producing an output signal when it is detected that the voltage levels of both input analog signals have a larger difference than prescribed.

11. A picture blur-alarm device according to claim 10, wherein said alarm means comprises:
a drive circuit which issues a drive signal when it is detected that a larger number of the plurality of comparators than prescribed have sent forth an output signal; and
a display circuit which is actuated in response to an output drive signal from said drive circuit.

12. A picture blur-alarm device according to claim 11, wherein said alarm means comprises:
a drive circuit which is actuated in response to an output signal from said comparison circuit, and produces a drive signal when it is detected that said comparison circuit has generated a larger number of output signals than prescribed in a given comparing cycle; and
a display circuit which is operated in response to an output signal from said drive circuit.

13. A picture blur-alarm device according to claim 12, wherein said comparison means is a window comparator.

14. A picture blur-alarm device according to claim 13, wherein said window comparator comprises:

first and second mutually connected resistive means which are connected at one end to a corresponding ones of said plurality of memory means;

first and second constant current sources which respectively supply a constant current to said first and second resistive means;

a first differential amplifier whose inverted input terminal is connected to the corresponding one of said plural photo-electric conversion elements and whose noninverted input terminal is connected to the other end of said first resistive means;

a second differential amplifier whose inverted input terminal is connected to the other end of said second resistive means and whose noninverted input terminal is connected to said corresponding one of said plurality of photo-electric conversion elements; and a logic circuit connected to said first and second differential amplifiers.

15. A picture blur-alarm device according to claim 10, wherein said comparison means is a window comparator.

16. A picture blur-alarm device according to claim 15, wherein said window comparator comprises:

first and second mutually connected resistive means which are connected at one end to a corresponding ones of said plurality of memory means;

first and second constant current sources which respectively supply a constant current to said first and second resistive means;

a first differential amplifier whose inverted input terminal is connected to the corresponding one of said plural photo-electric conversion elements and whose noninverted input terminal is connected to the other end of said first resistive means;

a second differential amplifier whose inverted input terminal is connected to the other end of said second resistive means and whose noninverted input terminal is connected to said corresponding one of said plurality of photo-electric conversion elements; and a logic circuit connected to said first and second differential amplifiers.

\* \* \* \* \*